US009445097B2

(12) United States Patent
Park

(10) Patent No.: US 9,445,097 B2
(45) Date of Patent: *Sep. 13, 2016

(54) IMAGE DECODING METHOD USING INTRA PREDICTION MODE

(71) Applicant: INFOBRIDGE PTE. LTD., Singapore (SG)

(72) Inventor: Shin Ji Park, Seoul (KR)

(73) Assignee: INFOBRIDGE PTE. LTD., Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 14/686,622

(22) Filed: Apr. 14, 2015

(65) Prior Publication Data
US 2015/0222892 A1    Aug. 6, 2015

Related U.S. Application Data

(63) Continuation of application No. 14/124,611, filed as application No. PCT/KR2012/003078 on Apr. 20, 2012, now Pat. No. 9,036,704.

(30) Foreign Application Priority Data

Oct. 24, 2011    (KR) .................. 10-2011-0108455

(51) Int. Cl.
*H04N 19/176*    (2014.01)
*H04N 19/105*    (2014.01)
(Continued)

(52) U.S. Cl.
CPC ............ *H04N 19/105* (2014.11); *H04N 19/11* (2014.11); *H04N 19/124* (2014.11);
(Continued)

(58) Field of Classification Search
None
See application file for complete search history.

(56) References Cited

U.S. PATENT DOCUMENTS 9,036,704 B2 * 5/2015 Park ................. H04N 19/00533
375/240.01
2011/0286520 A1 * 11/2011 Xu ....................... H04N 19/176
375/240.12

(Continued)

FOREIGN PATENT DOCUMENTS

JP           2009-246511 A     10/2009
KR    10-2004-0093252 A     11/2004

(Continued)

OTHER PUBLICATIONS

Bross et al., "High efficiency video coding (HEVC) text specification draft 6," Joint Collaborative Team on Video Coding (JCT-VC) of ITU-T SG16 WP3 and ISO/IEC JTC1/SC29/WG11, 8th Meeting, San José, CA, USA, Feb. 1-10, 2012, Document: JCTVC-H1003, pp. 1-249 (259 pages total).

(Continued)

*Primary Examiner* — Kevin McInnish
(74) *Attorney, Agent, or Firm* — Birch, Stewart, Kolasch & Birch, LLP

(57) ABSTRACT

An image decoding method is provided which includes reconstructing an intra prediction mode group indicator and a prediction mode index of a current block, constructing a first group using valid intra prediction modes of left and top blocks, and determining the intra prediction mode corresponding to the prediction mode index and the intra prediction mode group indicator. Therefore, by causing the first group to include modes having a high possibility of being equal to the prediction mode of the current block on the basis of the valid intra prediction modes of the left and top blocks of the current block and determining the intra prediction mode group indicator and the prediction mode index to be encoded using the first group, it is possible to reduce an amount of information of the intra prediction mode to be encoded.

6 Claims, 7 Drawing Sheets

(51) Int. Cl.

| | | |
|---|---|---|
| *H04N 19/593* | (2014.01) | |
| *H04N 19/11* | (2014.01) | |
| *H04N 19/124* | (2014.01) | |
| *H04N 19/157* | (2014.01) | |
| *H04N 19/44* | (2014.01) | |
| *H04N 19/159* | (2014.01) | |
| *H04N 19/70* | (2014.01) | |
| *H04N 19/91* | (2014.01) | |
| *H04N 19/61* | (2014.01) | |

(52) U.S. Cl.
 CPC ......... *H04N 19/157* (2014.11); *H04N 19/159* (2014.11); *H04N 19/176* (2014.11); *H04N 19/44* (2014.11); *H04N 19/593* (2014.11); *H04N 19/70* (2014.11); *H04N 19/91* (2014.11); *H04N 19/61* (2014.11)

(56) References Cited

U.S. PATENT DOCUMENTS

| | | | | |
|---|---|---|---|---|
| 2011/0292994 | A1* | 12/2011 | Lim | H04N 19/182 |
| | | | | 375/240.02 |
| 2012/0082221 | A1* | 4/2012 | Liu | H04N 19/176 |
| | | | | 375/240.12 |
| 2012/0082222 | A1* | 4/2012 | Wang | H04N 19/176 |
| | | | | 375/240.12 |
| 2012/0082223 | A1* | 4/2012 | Karczewicz | H04N 19/196 |
| | | | | 375/240.12 |
| 2012/0314766 | A1* | 12/2012 | Chien | H04N 19/176 |
| | | | | 375/240.12 |
| 2015/0222891 | A1* | 8/2015 | Park | H04N 19/00533 |
| | | | | 375/240.02 |
| 2015/0222897 | A1* | 8/2015 | Park | H04N 19/00533 |
| | | | | 375/240.02 |
| 2015/0222929 | A1* | 8/2015 | Park | H04N 19/00533 |
| | | | | 375/240.12 |

FOREIGN PATENT DOCUMENTS

| | | |
|---|---|---|
| KR | 10-2011-0019855 A | 3/2011 |
| WO | WO 2013/051903 A1 | 4/2013 |
| WO | WO 2013/064099 A1 | 5/2013 |

OTHER PUBLICATIONS

Bross et al., "WD4: Working Draft 4 of High-Efficiency Video Coding," Joint Collaborative Team on Video Coding (JCT-VC) of ITU-T SG16 WP3 and ISO/IEC JTC1/SC29/WG11, 6th Meeting, Torino, IT, Jul. 14-22, 2011, Document: JCTVC-F803_d6, pp. 1-217 (229 pages total).

Chien et al., "Parsing friendly intra mode coding," Joint Collaborative Team on Video Coding (JCT-VC) of ITU-T SG16 WP3 and ISO/IEC JTC1/SC29/WG11, 6th Meeting, Torino, IT, Jul. 14-22, 2011, Document: JCTVC-F459 (version 1), pp. 1-5.

Chien et al., "Parsing friendly intra mode coding," Joint Collaborative Team on Video Coding (JCT-VC) of ITU-T SG16 WP3 and ISO/IEC JTC1/SC29/WG11, 6th Meeting, Torino, IT, Jul. 14-22, 2011, Document: JCTVC-F459 (version 4), pp. 1-5.

Chuang et al., "Luma Intra Prediction Mode Coding," Joint Collaborative Team on Video Coding (JCT-VC) of ITU-T SG16 WP3 and ISO/IEC JTC1/SC29/WG11, 6th Meeting, Torino, IT, Jul. 14-22, 2011, Document: JCTVC-F062, pp. 1-5.

Kumakura et al., "Intra prediction mode coding based on direction difference," Joint Collaborative Team on Video Coding (JCT-VC) of ITU-T SG16 WP3 and ISO/IEC JTC1/SC29/WG11, 6th Meeting, Torino, IT, Jul. 14-22, 2011, Document: JCTVC-F339, pp. 1-13.

Maani et al., "Intra mode coding using logical mode numbering," Joint Collaborative Team on Video Coding (JCT-VC) of ITU-T SG16 WP3 and ISO/IEC JTC1/SC29/WG11, 8th Meeting, San José, CA, USA, Feb. 1-10, 2012, Document: JCTVC-H0407, pp. 1-5.

Minezawa et al., "An improved intra vertical and horizontal prediction," Joint Collaborative Team on Video Coding (JCT-VC) of ITU-T SG16 WP3 and ISO/IEC JTC1/SC29/WG11, 6th Meeting, Torino, IT, Jul. 14-22, 2011, Document: JCTVC-F172, pp. 1-6.

Wiegand et al., "WD3: Working Draft 3 of High-Efficiency Video Coding," Joint Collaborative Team on Video Coding (JCT-VC) of ITU-T SG16 WP3 and ISO/IEC JTC1/SC29/WG11, 5th Meeting, Geneva, CH, Mar. 16-23, 2011, Document: JCTVC-E603, 217 pages.

* cited by examiner

IMAGE DECODING METHOD USING INTRA PREDICTION MODE

CROSS-REFERENCE TO RELATED PATENT APPLICATIONS

This application is a continuation of U.S. patent application Ser. No. 14/124,611 filed on Apr. 10, 2014 (now U.S. Pat. No. 9,036,704), which is a 35 U.S.C. §371 national stage filing of International Application No. PCT/KR2012/003078, filed Apr. 20, 2012, which claims the benefit of Korean Patent Application No. 10-2011-0108455, filed on Oct. 24, 2011. The contents of each of the foregoing applications are incorporated herein by reference in their entireties.

TECHNICAL FIELD

The present invention relates to an image decoding method and an image decoding device, and more particularly, to a method and a device that create an intra prediction block of each sub block of a current block using size information of a prediction block and creates a reconstructed block.

BACKGROUND ART

Image data has to be encoded to efficiently store or transmit the image data. MPEG-1, MPEG-2, MPEG-4, H.264/MPEG-4 AVC (Advanced Video Coding), and the like are known as techniques of encoding image data. In these techniques, a picture is divided into macro blocks, it is determined which of intra encoding or inter encoding should be performed in the unit of the macro blocks, and the macro blocks are encoded using the determined encoding method.

In H.264 which is a latest image compressing technique, intra prediction is performed to enhance the efficiency of the intra encoding. That is, instead of referring to a reference picture to encode a current block, a prediction block is created using pixel values spatially neighboring the current block to be encoded. Specifically, an intra prediction mode having a small distortion is selected through comparison with an original macro block using the neighboring pixel values and the prediction block of the current block to be encoded is created using the selected intra prediction mode and the neighboring pixel values. A residual block including difference signals between the current block and the prediction block is created and the residual block is transformed, quantized, and entropy-encoded. The intra prediction mode used to create the prediction block is also encoded.

However, in H.264, the intra prediction mode of a current block is encoded regardless of directivity of the intra prediction modes of the left and top blocks of the current block and there is thus a problem in that the encoding efficiency is low. When the number of intra prediction modes increases to enhance the encoding efficiency of a residual block, there is a need for an intra prediction encoding method having efficiency higher than that of the intra prediction mode encoding method of H.264.

In H.264, only one reconstructed block having the size equal to the current block is created using the intra prediction mode of the current block. Therefore, when the size of the current block increases, there is a problem in that the residual signal between the prediction block and the original block increases and encoding efficiency is lowered. Accordingly, there is a need for new intra prediction encoding/decoding methods for creating a prediction block more similar to the original block.

SUMMARY OF THE INVENTION

Technical Problem

An object of the invention is to provide a method and a device which can enhance compression efficiency of an image by reducing the number of bits required for encoding an intra prediction mode of a current block using intra prediction modes of left and top blocks of the current block.

Another object of the invention is to provide a method and a device which can enhance compression efficiency of an image by creating a prediction block more similar to a current block using an intra prediction mode of the current block to reduce the number of bits required for encoding a residual block.

Solution to Problem

According to an aspect of the invention, there is provided an image decoding method including: reconstructing an intra prediction mode group indicator and a prediction mode index of a current block; constructing a first group (MPM group) using valid intra prediction modes of left and top blocks of the current block; determining the intra prediction mode corresponding to the prediction mode index in the first group as the intra prediction mode of the current block when the intra prediction mode group indicator indicates the first group and determining the intra prediction mode corresponding to the prediction mode index in a second group when the intra prediction mode group indicator indicates the second group; and creating a prediction block, wherein the size of the prediction block is determined depending on transform size information.

In the image decoding method, the first group may include three intra prediction modes. When only one of the intra prediction modes of the left and top blocks of the current block is valid, two intra prediction modes may be added to the first group. The added two intra prediction modes may be determined depending on the valid intra prediction modes.

Advantageous Effects

The image decoding method according to the invention includes: reconstructing an intra prediction mode group indicator and a prediction mode index of a current block; constructing a first group (MPM group) using valid intra prediction modes of left and top blocks of the current block; determining the intra prediction mode corresponding to the prediction mode index in the first group as the intra prediction mode of the current block when the intra prediction mode group indicator indicates the first group and determining the intra prediction mode corresponding to the prediction mode index in a second group when the intra prediction mode group indicator indicates the second group; and creating a prediction block. The size of the prediction block is determined depending on transform size information.

Therefore, by causing the first group to include modes having a high possibility of being equal to the prediction mode of the current block on the basis of the valid intra prediction modes of the left and top blocks of the current block and determining the intra prediction mode group indicator and the prediction mode index to be encoded using the first group, it is possible to reduce an amount of information of the intra prediction mode to be encoded. By creating a prediction block similar to the current block, it is possible to reduce the number of bits of a residual block to be encoded/decoded to enhance encoding and decoding efficiency.

DESCRIPTION OF EXEMPLARY EMBODIMENTS

Figure 1:
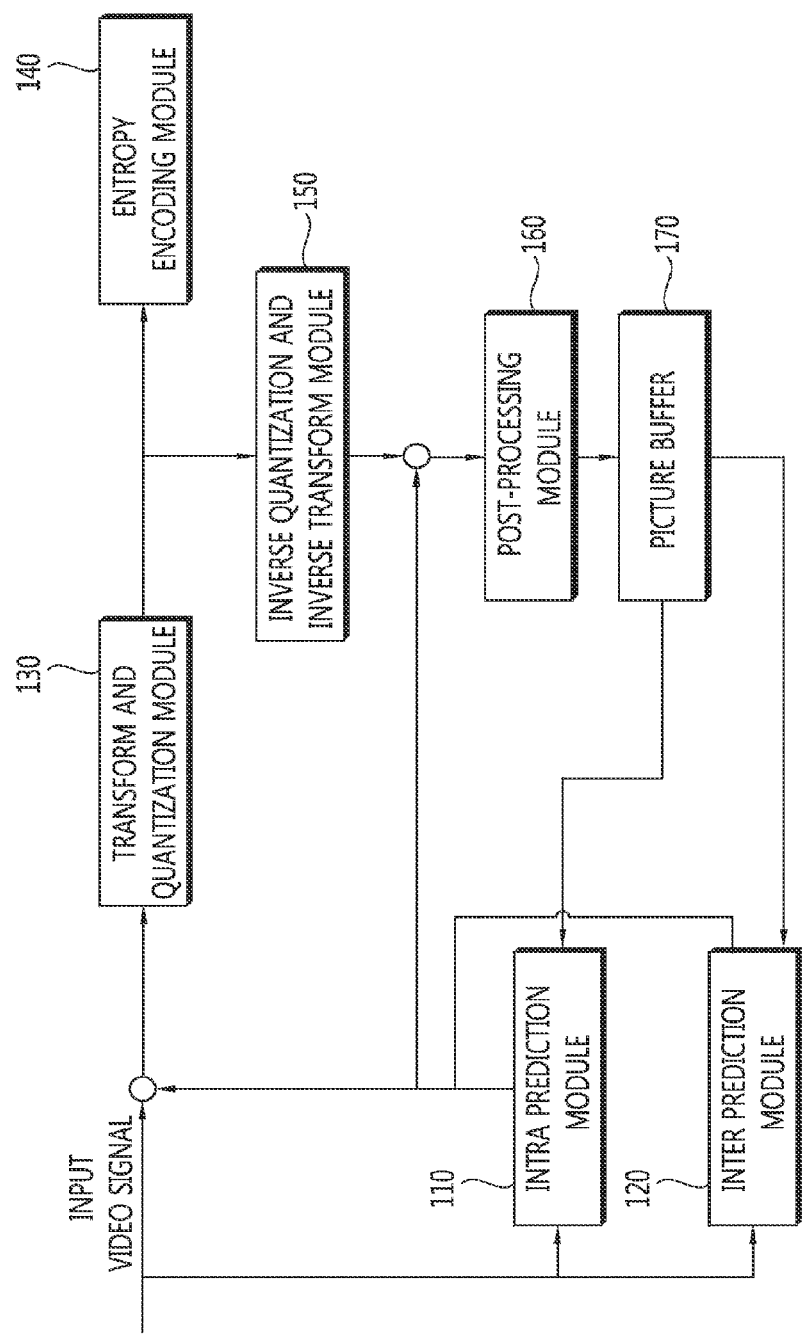
FIG. 1 is a block diagram illustrating a moving image encoding device according to an embodiment of the invention.

Hereinafter, various embodiments of the invention will be described in detail with reference to the accompanying drawings. The invention can be modified in various forms and can have various embodiments. The embodiments are not intended for limiting the invention, but it should be understood that the invention includes all the modifications, equivalents, and replacements belonging to the spirit and the technical scope of the invention. In description of the invention with reference to the drawings, like constituents are referenced by like reference numerals.

A moving image encoding device and a moving image decoding device according to the invention may be user terminals such as a personal computer, a notebook PC, a personal digital assistant, a portable multimedia player, a smart phone, a wireless communication terminal, and a TV or servers providing services. The moving image encoding device and the moving image decoding device may be apparatuses having a communication device such as a communication modem for communicating with various apparatuses or wireless or wired communication networks, a memory storing various programs and data for encoding and decoding an image, and a microprocessor performing the programs to perform operations and controls.

FIG. 1 is a block diagram illustrating a moving image encoding device according to an embodiment of the invention.

The moving image encoding device 100 according to the embodiment of the invention includes an intra prediction module 110, an inter prediction module 120, a transform and quantization module 130, an entropy encoding module 140, an inverse quantization and inverse transform module 150, a post-processing module 160, a picture buffer 170, a subtraction module 190, and an addition module 195.

The intra prediction module 110 creates an intra prediction block using reconstructed pixels of a picture or slice to which a current block belongs. The intra prediction module 110 selects one of a predetermined number of intra prediction modes depending on the size of the current block to be prediction-encoded and creates a prediction block depending on the selected intra prediction mode.

The inter prediction module 120 performs a motion estimation operation using reference pictures stored in the picture buffer 170 and determines reference picture indices and motion vectors for the motion estimation operation. Then, the inter prediction module 120 creates an inter prediction block of the current block using the reference picture indices and the motion vectors.

The transform and quantization module 130 transforms and quantizes a residual block of the prediction block created by the intra prediction module 110 or the inter prediction module 120. The transform is performed using one-dimensional transform matrixes in the horizontal and vertical directions. The residual block for intra prediction is transformed using transform matrixes determined depending on the size of the transform block (that is, the size of the residual block) and the intra prediction mode. The residual block for inter prediction is transformed using predetermined transform matrixes.

The transform and quantization module 130 quantizes the transform block using a quantization step size. The quantization step size can be changed by coding units equal to or larger than a predetermined size.

The quantized transform block is supplied to the inverse quantization and inverse transform module 150 and the entropy encoding module 140.

The inverse quantization and inverse transform module 150 inversely quantizes the quantized transform block and inversely transform the inversely-quantized transform block to reconstruct the residual block. The addition module adds the residual block reconstructed by the inverse quantization and inverse transform module 150 and the prediction block from the intra prediction module 110 or the inter prediction module 120 to creates a reconstructed block.

The post-processing module 160 serves to improve image quality of the reconstructed picture and includes a deblocking filter module 161, an offset module 162, and a loop filter module 163.

The deblocking filter module 161 adaptively applies a deblocking filter to boundaries of the prediction block and the transform block. The boundaries can be limited to boundaries of 8×8 grids. The deblocking filter module 161 determines the boundaries to be filtered, determines boundary strengths thereof, and determines whether the deblocking filter should be applied to the boundaries when the boundary strength is larger than 0. When it is determined that the boundaries should be filtered, the deblocking filter module 161 selects a filter to be applied to the boundaries and filters the boundaries with the selected filter.

The offset module 162 determines whether an offset should be applied by pictures or slices so as to reduce the distortion between a pixel in the image undergoing the deblocking filter module and a corresponding original pixel. Alternatively, a slice is divided into plural offset areas and the offset type of each offset area can be determined The offset type may include a predetermined number of edge offset types and band offset types. When the offset type is an edge offset type, the edge type to which each pixel belongs is determined and an offset corresponding thereto is applied. The edge type is determined on the basis of the distribution of two pixel values neighboring a current pixel.

The loop filter module 163 adaptively loop-filters the reconstructed image on the basis of the comparison result of the reconstructed image undergoing the offset module 162 with the original image. It is determined whether the reconstructed image should be loop-filtered by coding units. The size and coefficients of the loop filter to be applied may changed by the coding units. Information indicating whether the adaptively loop filter should be applied by coding units may be included in each slice header. In case of a chroma signal, it can be determined whether the adaptive loop filter should be applied by pictures. Therefore, information indicating whether chroma components are filtered may be included in a slice header or a picture header.

The picture buffer 170 receives post-processed image data from the post-processing module 160 and reconstructs and stores an image in the unit of pictures. The picture may be an image in the unit of frames or an image in the unit of fields.

The entropy encoding module 140 entropy-encodes the quantization coefficient information quantized by the transform and quantization module 130, the intra prediction information received from the intra prediction module 140, the motion information received from the inter prediction unit 150, and the like. The entropy encoding module 140 includes a scanning module 145 which is used to transform coefficients of the quantized transform block into one-dimensional quantization coefficients.

The scanning module 145 determines a scanning type for transforming the coefficients of the quantized transform block into one-dimensional quantization coefficients. The scanning type may vary depending on a directional intra prediction mode and the size of a transform block. The quantization coefficients are scanned in the backward direction.

When the quantized transform block is larger than a predetermined size, the transform coefficients are divided into plural sub blocks and are scanned. The scanning types applied to the transform coefficients of the sub blocks are the same. The scanning types applied to the sub blocks may be a zigzag scan or may be the same scanning types as applied to the transform coefficients of the sub blocks.

Figure 2:
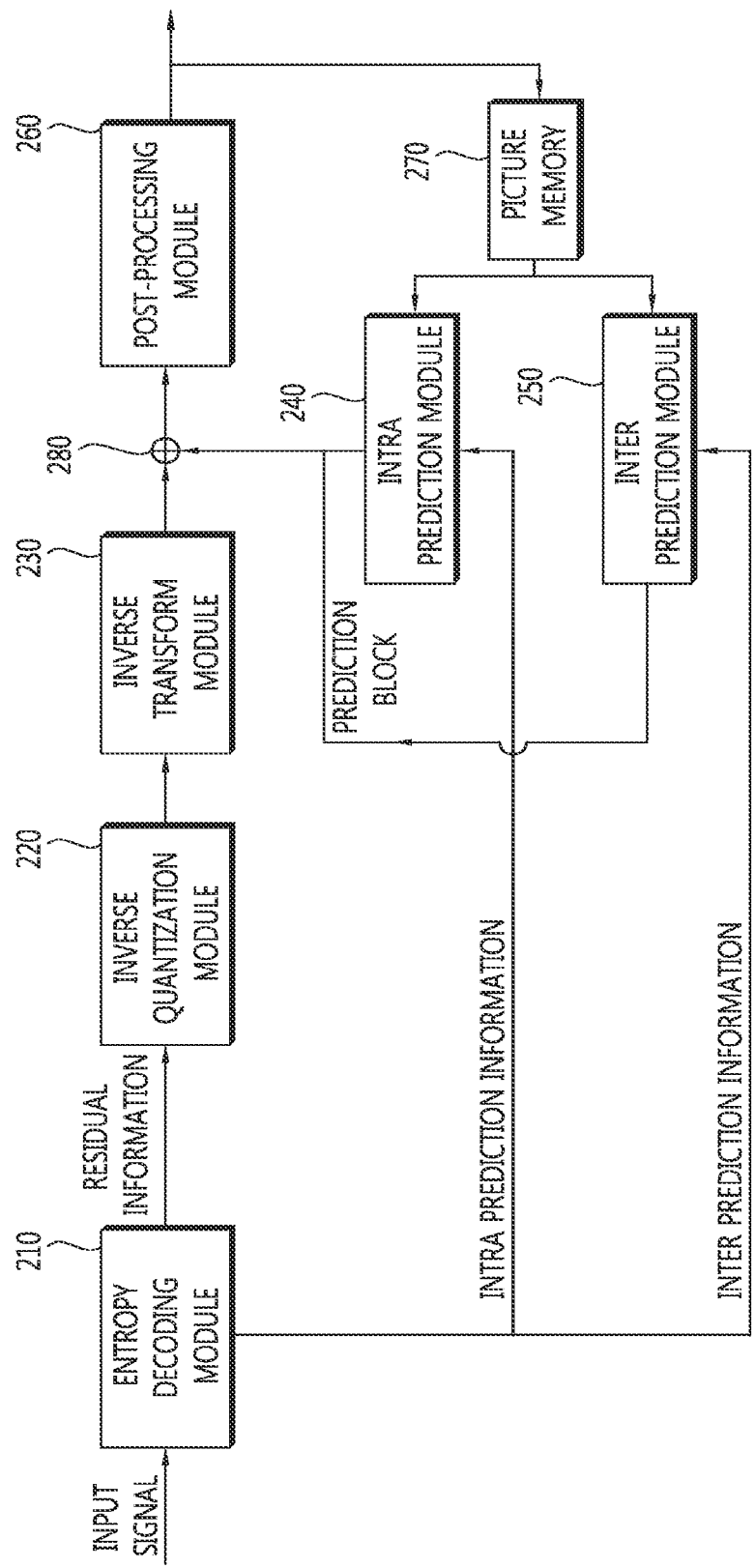
FIG. 2 is a block diagram illustrating a moving image decoding device according to another embodiment of the invention.

FIG. 2 is a block diagram illustrating a moving image decoding device 200 according to an embodiment of the invention.

The moving image decoding device 200 according to the embodiment of the invention includes an entropy decoding module 210, an inverse quantization module 220, an inverse transform module 230, an intra prediction module 240, an inter prediction module 250, a post-processing module 260, a picture buffer 270, and an addition module 280.

The entropy decoding module 210 decodes a received bit stream and separates the bit stream into intra prediction information, inter prediction information, quantization coefficient information, and the like therefrom. The entropy decoding module 210 supplies the decoded intra prediction information to the intra prediction module 240 and supplies the decoded inter prediction information to the inter prediction module 250. The entropy decoding module 210 includes an inverse scanning module 215 for inversely scanning the decoded quantization coefficient information.

The inverse scanning module 215 converts the quantization coefficient information into a two-dimensional quantization block. One of plural scanning types is selected for the conversion. The scanning type may vary depending on a directional intra prediction mode and the size of a transform block. The quantization coefficients are scanned in the backward direction. When the quantized transform block is larger than a predetermined size, the coefficients are divided into plural sub blocks and are scanned. The scanning types applied to the transform coefficients of the sub blocks are the same. The scanning types applied to the sub blocks may be a zigzag scan or may be the same scanning types as applied to the transform coefficients of the sub blocks.

The inverse quantization module 220 determines a quantization step size predictor of a current coding unit and adds the determined quantization step size predictor to the received residual quantization step size to reconstruct the quantization step size of the current coding unit. The inverse quantization module 220 inversely quantizes the quantization block using the quantization step size and the inverse quantization matrix. The quantization matrix is determined depending on the size of the quantization block and the prediction mode. That is, the quantization matrix is selected on the basis of at least one of the prediction mode of the current block and the intra prediction modes for the quantization block having a predetermined size.

The inverse transform module 230 inversely transforms the inversely-quantized transform block to reconstruct a residual block. The inverse transform matrix to be applied to the inverse quantization block can be determined depending on the prediction mode and the intra prediction mode.

The addition module 280 adds the prediction block created by the intra prediction module 240 or the inter prediction module 250 to the residual block reconstructed by the inverse transform module 230 to create a reconstructed block.

The intra prediction module 240 reconstructs the intra prediction mode of the current block on the basis of the intra prediction information received from the entropy decoding module 210. Then, the intra prediction module 240 creates a prediction block depending on the reconstructed intra prediction mode.

The inter prediction module 250 reconstructs the reference picture index and the motion vector on the basis of the inter prediction information received from the entropy decoding module 210. Then, the inter prediction module 250 creates a prediction block of the current block using the reference picture index and the motion vector. When motion compensation with decimal prediction is applied, the selected interpolation filter is applied to create the prediction block.

The operation of the post-processing module 260 is the same as the operation of the post-processing module 160 shown in FIG. 1 and thus will not be described again.

The picture buffer 270 stores the decoded image post-processed by the post-processing module 260 in the unit of pictures.

Figure 3:
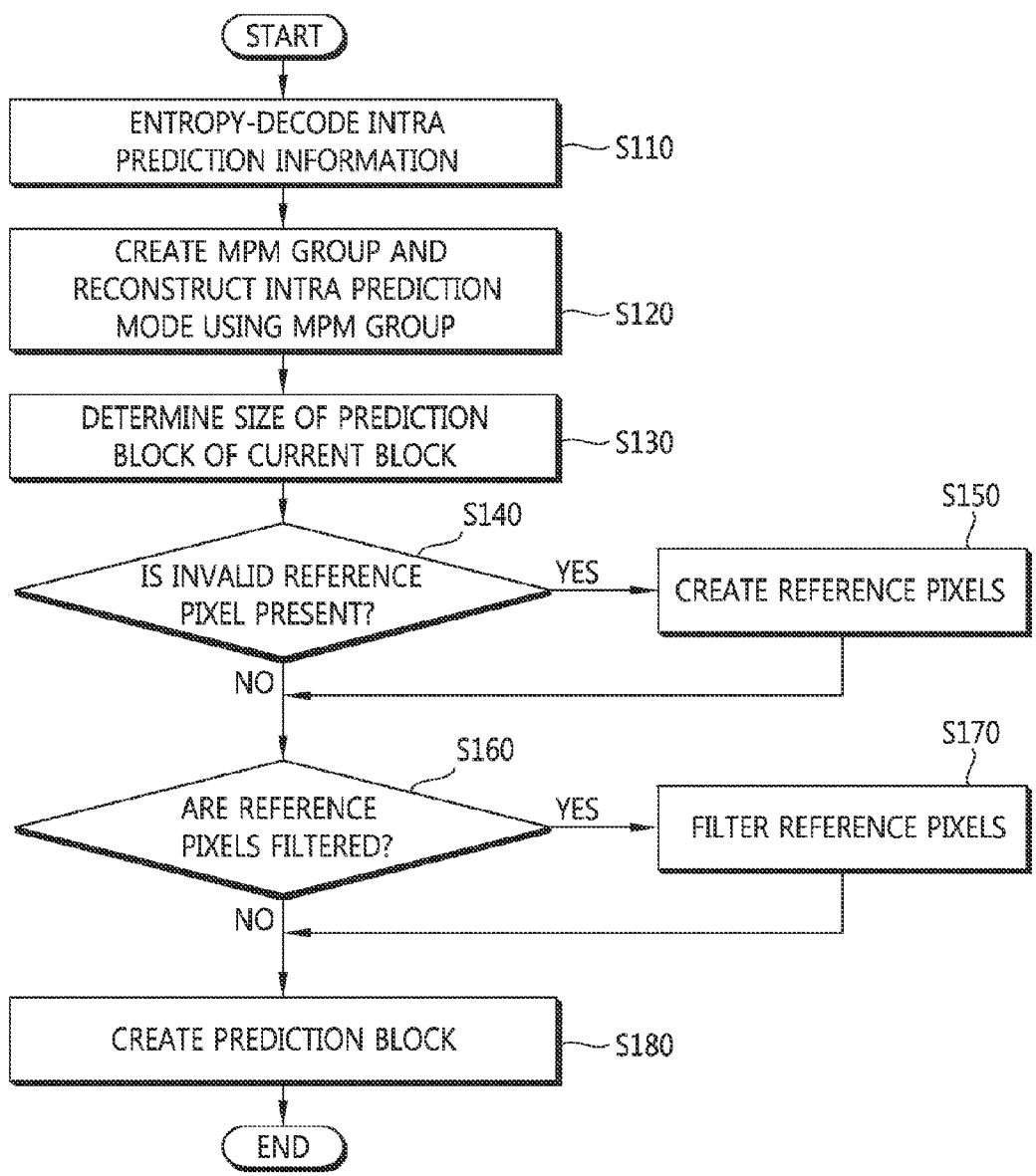
FIG. 3 is a diagram illustrating a method of creating an intra prediction block in the moving image decoding device according to the embodiment of the invention.

FIG. 3 is a diagram illustrating a method of creating an intra prediction block according to the embodiment of the invention.

First, the intra prediction information from the received bit stream is entropy-decoded (S110).

The intra prediction information includes the intra prediction mode group indicator and the prediction mode index. The intra prediction mode group indicator indicates whether the intra prediction mode of the current block belongs to an MPM group or a group other than the MPM group. The prediction mode index is information indicating a specific intra prediction mode in the intra prediction mode group indicated by the intra prediction mode group indicator.

The intra prediction mode group indicator can be received in the form of unsigned integer. In this case, the intra prediction mode group indicator can be used without being entropy-decoded. Alternatively, the intra prediction mode group indicator may be adaptively entropy-encoded depending on the type of a current slice. For example, the intra prediction mode group indicator may be entropy-encoded using contexts determined depending on the slice type. Therefore, the intra prediction mode group indicator may be decoded using the contexts determined depending on the type of the current slice. The entropy-encoding method of the prediction mode index varies depending on whether the intra prediction mode belongs to the MPM group or not. Therefore, the prediction mode index is entropy-decoded using different methods. Specifically, when the intra prediction mode group indicator represents that the intra prediction mode of the current block belongs to the MPM group, the prediction mode index is binarized in a truncated Exp-Golomb code manner or a truncated unary manner and is then entropy-encoded. Therefore, after the binary information is acquired by performing the entropy decoding, the prediction mode index is reconstructed using the above-mentioned methods. When the intra prediction mode group indicator represents that the intra prediction mode of the current block does not belong to the MPM group, the prediction mode index can be binarized with a fixed length. Therefore, after the binary information is acquired by performing the entropy decoding, the prediction mode index can be reconstructed.

Figure 4:
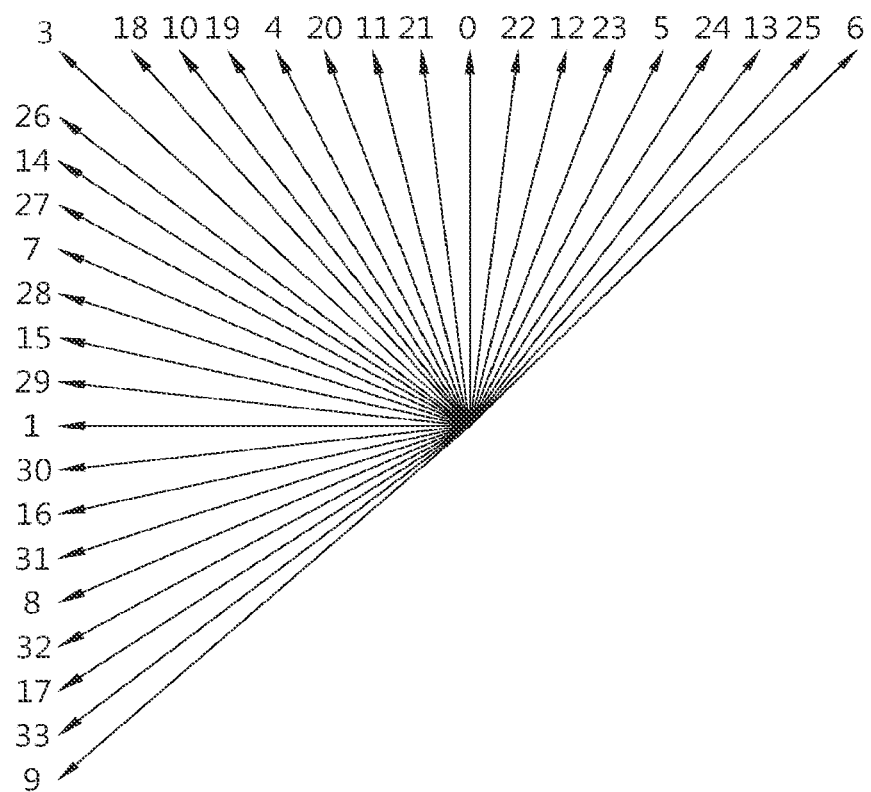
FIG. 4 is a conceptual diagram illustrating intra prediction modes according to the embodiment of the invention.

Then, the MPM group is created using the intra prediction modes of the blocks neighboring the current block and then the intra prediction mode of the current block is reconstructed using the MPM group (S120). The MPM group includes three intra prediction modes. This will be described with reference to FIG. 4. FIG. 4 is a diagram illustrating intra prediction modes according to an embodiment of the invention.

(1) When the intra prediction modes of the top and left blocks of a current block are both present and are different from each other, the MPM group includes the two intra prediction modes and one additional intra prediction mode.

When one of the two intra prediction modes is a DC mode and the other is not a planar mode, the additional intra prediction mode may be the planar mode. Similarly, when one of the two intra prediction modes is the planar mode and the other is not the DC mode, the additional intra prediction mode may be the DC mode.

When the two intra prediction modes are the DC mode and the planar mode, the additional intra prediction mode may be a vertical mode or a horizontal mode.

When the two intra prediction modes are not the DC mode nor the planar mode, the additional intra prediction mode may be an intra prediction mode having directionality between the two intra prediction modes, or the DC mode or the planar mode.

(2) When the intra prediction modes of the top and left blocks of the current block are both present and are equal to each other, the MPM group includes the intra prediction mode and two additional intra prediction modes.

When the intra prediction mode is neither the DC mode nor the planar mode, the two additional intra prediction modes are set to two intra prediction modes neighboring the intra prediction mode. When the intra prediction mode is the DC mode, the two additional intra prediction modes may be the planar mode and the vertical mode.

(3) When only one of the intra prediction modes of the top and left blocks of the current block is present, the MPM group includes the intra prediction mode and two additional intra prediction modes. The two additional intra prediction modes are determined depending on the intra prediction mode.

(4) When the intra prediction modes of the top and left blocks of the current block are not present at all, the MPM group includes the DC mode, the planar mode, and the vertical mode.

When the intra prediction mode group indicator indicates the MPM group, the intra prediction mode indicated by the prediction mode index is selected from the MPM group and the selected intra prediction mode is determined as the intra prediction mode of the current block. The intra prediction mode group indicator may be flag information representing whether the intra prediction mode of the current block belongs to the MPM group or a group other than the MPM group.

When the intra prediction mode group indicator does not indicates the MPM group, the intra prediction module 240 determines the intra prediction mode indicated by the prediction mode index out of the intra prediction modes (hereinafter, referred to as residual intra prediction modes) other than the intra prediction modes belonging to the MPM group as the intra prediction mode of the current block. The prediction mode indices assigned to the residual intra prediction modes vary depending on the configuration of the MPM group. That is, the decoded prediction mode indices indicate indices of the residual intra prediction modes rearranged depending on the configuration of the MPM group. Therefore, the intra prediction module 240 selects the intra prediction mode of the current block from the residual intra prediction modes depending on the decoded prediction mode index and the intra prediction modes belonging to the MPM group.

Specifically, the residual intra prediction modes of the current block are rearranged in the mode number order and the intra prediction mode corresponding to the received prediction mode index is selected as the intra prediction mode of the current block. In this case, the residual intra prediction modes may be rearranged, but the intra prediction mode of the current block may be determined by comparison of the intra prediction mode numbers belonging to the MPM group with the intra prediction mode index of the current block.

This method can be applied to a case where mode number 2 is assigned to the DC mode of the non-directional modes, mode number 34 is assigned to the planar mode, and directional mode numbers are assigned to the other modes. However, since the probability of selecting the planar mode and the DC mode as the intra prediction mode of the current is higher than those of the other directional modes, a small mode number (for example, mode number 0) is assigned to the planar mode and the above-mentioned method can be applied. In this case, the mode numbers of the other lower-ranked modes increase by 1.

Alternatively, the lowest indices may be assigned to the non-directional modes. For example, when the intra prediction mode of the current block is the planar mode and the residual intra prediction modes include the planar mode, the intra prediction mode index may include 0. For example, when the residual intra prediction modes include the planar mode and the DC mode, the intra prediction mode corresponding to the prediction mode index in a state where the planar mode, the DC mode, and the directional modes are arranged in this order may be set as the intra prediction mode of the current block. For example, mode number 0 and mode number 1 may be assigned to the planar mode the DC mode, respectively, or mode number 0 and mode number 1 may be assigned to the DC mode and the planar mode, respectively. In this case, the intra prediction mode index of the current block may be compared with the intra prediction mode numbers belonging to the MPM group to determine the intra prediction mode of the current block.

Then, the size of the prediction block is determined using information indicating the transform size of the current block (S130).

When the size of the prediction block is equal to the size of the current block, the prediction block is created using the intra prediction mode of the current block and the reference pixels of the current block. The reference pixels are pixels reconstructed or created previously to the current block.

When the size of the prediction block is smaller than the size of the current block, that is, when the current block can be divided into plural sub blocks and the intra prediction is performed thereon, the same intra prediction mode (that is, the intra prediction mode of the current block) is used to create the prediction block of each sub block. The prediction blocks of the second sub block or sub blocks subsequent thereto in the decoding order are created using the reconstructed pixels of the preceding sub blocks. Therefore, after the prediction block, the residual block, and the reconstructed block are created in the units of sub blocks, the prediction block of the next sub block is created.

Then, it is determined whether the reference pixels of the block corresponding to the size of the prediction block are all valid (S140). The reference pixels are pixels which are previously decoded and reconstructed. When it is determined that at least one of the reference pixels is not valid, the reference pixels is created (S150).

Specifically, when it is determined that the reference pixels are not valid at all, the reference pixel values are replaced with values of 2L-1. Here, L represents the number of bits representing the gray scale of luma components.

When valid reference pixels are present in only one direction with respect to the position of the invalid reference pixel, the closest reference pixel out of the valid reference pixels is copied to create the reference pixels.

When valid reference pixels are present in both directions with respect to the position of the invalid reference pixel, the reference pixel located at the closest position in a predetermined direction can be copied or two closest reference pixels in both directions can be averaged to create the reference pixels.

Then, it is determined whether the reference pixels should be filtered (S160). The reference pixels are adaptively filtered depending on the reconstructed intra prediction mode and the size of the prediction block (S170).

The reference pixels are not filtered when the intra prediction mode is the DC mode. When the intra prediction modes are the vertical mode and the horizontal mode, the intra prediction module 240 does not also filter the reference pixels. However, when the intra prediction modes are directional modes other than the vertical mode and the horizontal mode, the reference pixels are adaptively filtered depending on the intra prediction mode and the size of the prediction block. When the size of the prediction block is 4×4, the reference pixels are not filtered for the purpose of a decrease in complexity regardless of the intra prediction mode. The filtering serves to smooth the variation in pixel value between reference pixels and uses a low-pass filter. The low-pass filter may be [1, 2, 1] which is a 3-tap filter or [1, 2, 4, 2, 1] which is a 5-tap filter. When the size of the prediction block ranges from 8×8 to 32×32, the reference pixels are filtered in more intra prediction modes with an increase in the size of the prediction block.

Then, the prediction block is created depending on the intra prediction mode (S180). The reference pixels used for the prediction block may be pixels which are adaptively filtered depending on the size of the prediction block and the intra prediction mode.

In the DC mode, the average values of N top reference pixels located at positions of (x=0, . . . , N−1, y=−1), M left reference pixels located at positions of (x=1−, y=0, . . . , M−1), and the corner pixel located at a position of (x=−1, y=−1) can be determined as the prediction pixels of the prediction block. However, the prediction pixels neighboring the reference pixels can be created using weighted average of the average value and the reference pixel neighboring the prediction pixel. In the planar mode, the prediction pixels can be created in the same was as in the DC mode.

In the vertical mode, the reference pixels located in the vertical direction are set to the prediction pixels. However, the prediction pixel neighboring the left reference pixel can be created using the reference pixel located in the vertical direction and the variation between the left reference pixels. The variation represents the variation between the corner reference pixel and the left reference pixel neighboring the prediction pixel. In the horizontal mode, the prediction pixels can be created in the same way as in the vertical mode, except for the direction.

Figure 5:
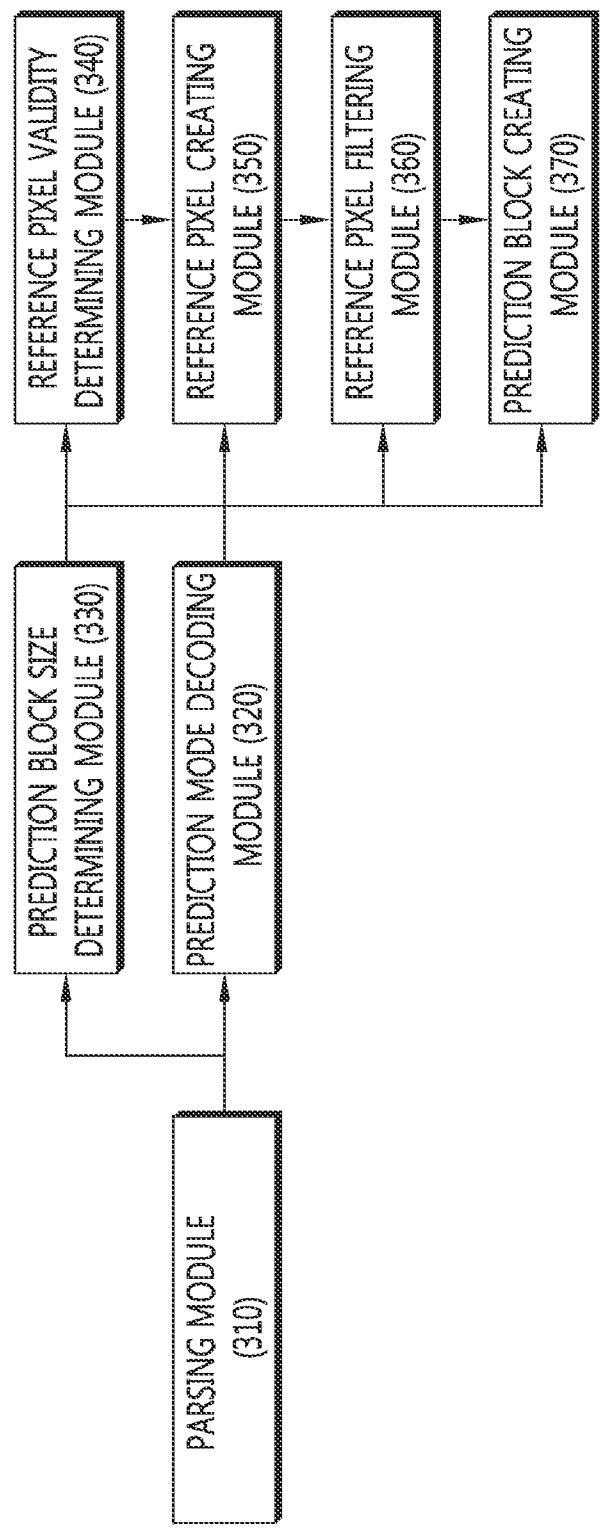
FIG. 5 is a block diagram illustrating an intra prediction block creating unit 300 according to the embodiment of the invention.

FIG. 5 is a block diagram illustrating an intra prediction block creating unit 300 according to the embodiment of the invention. The intra prediction block creating unit 300 according to the invention includes a parsing module 310, a prediction mode decoding module 320, a prediction block size determining module 330, a reference pixel validity determining module 340, a reference pixel creating module 350, a reference pixel filtering module 360, a prediction block creating module 370.

The parsing module 310 entropy-decodes a received bit stream to acquired intra prediction information and transform block size information.

The intra prediction information includes an intra prediction mode group indicator and a prediction mode index. The intra prediction mode group indicator represents which of an MPM group and a group other than the MPM group the intra prediction mode of a current block belongs to. The prediction mode index is information representing a specific intra prediction mode in the intra prediction mode group indicated by the intra prediction mode group indicator. The method of entropy-decoding the intra prediction information is the same as in step S110 of FIG. 3.

The transform block size information includes at least one flag (split_transform_flag) which represents the transform block size and which is transmitted from an encoder.

The prediction mode decoding module 320 creates an MPM group using the intra prediction modes of blocks neighboring a current block and reconstructs the intra prediction mode of the current block using the MPM group and the entropy-decoded intra prediction information. The MPM group includes three intra prediction modes.

(1) When the intra prediction modes of the top and left blocks of a current block are both present and are different from each other, the MPM group includes the two intra prediction modes and one additional intra prediction mode.

When one of the two intra prediction modes is a DC mode and the other is not a planar mode, the additional intra prediction mode may be the planar mode. Similarly, when one of the two intra prediction modes is the planar mode and the other is not the DC mode, the additional intra prediction mode may be the DC mode.

When the two intra prediction modes are the DC mode and the planar mode, the additional intra prediction mode may be a vertical mode or a horizontal mode.

When the two intra prediction modes are not the DC mode nor the planar mode, the additional intra prediction mode may be an intra prediction mode having directionality between the two intra prediction modes, or the DC mode or the planar mode.

(2) When the intra prediction modes of the top and left blocks of the current block are both present and are equal to each other, the MPM group includes the intra prediction mode and two additional intra prediction modes.

When the intra prediction mode is neither the DC mode nor the planar mode, the two additional intra prediction modes are set to two intra prediction modes neighboring the intra prediction mode. When the intra prediction mode is the DC mode, the two additional intra prediction modes may be the planar mode and the vertical mode.

(3) When only one of the intra prediction modes of the top and left blocks of the current block is present, the MPM group includes the intra prediction mode and two additional intra prediction modes. The two additional intra prediction modes are determined depending on the intra prediction mode.

(4) When the intra prediction modes of the top and left blocks of the current block are not present at all, the MPM group includes the DC mode, the planar mode, and the vertical mode.

When the intra prediction mode group indicator indicates the MPM group, the intra prediction mode indicated by the prediction mode index is selected from the MPM group and the selected intra prediction mode is determined as the intra prediction mode of the current block. The intra prediction mode group indicator may be flag information representing whether the intra prediction mode of the current block belongs to the MPM group or a group other than the MPM group.

When the intra prediction mode group indicator does not indicates the MPM group, the intra prediction module 240 determines the intra prediction mode indicated by the prediction mode index out of the intra prediction modes (hereinafter, referred to as residual intra prediction modes) other than the intra prediction modes belonging to the MPM group as the intra prediction mode of the current block. The prediction mode indices assigned to the residual intra prediction modes vary depending on the configuration of the MPM group. That is, the decoded prediction mode indices indicate indices of the residual intra prediction modes rearranged depending on the configuration of the MPM group. Therefore, the intra prediction module 240 selects the intra prediction mode of the current block from the residual intra prediction modes depending on the decoded prediction mode index and the intra prediction modes belonging to the MPM group.

Specifically, the residual intra prediction modes of the current block are rearranged in the mode number order and the intra prediction mode corresponding to the received prediction mode index is selected as the intra prediction mode of the current block. In this case, the residual intra prediction modes may be rearranged, but the intra prediction mode of the current block may be determined by comparison of the intra prediction mode numbers belonging to the MPM group with the intra prediction mode index of the current block.

The MPM group constructing method can be applied to a case where mode number 2 is assigned to the DC mode of the non-directional modes, mode number 34 is assigned to the planar mode, and directional mode numbers are assigned to the other modes. However, since the probability of selecting the planar mode and the DC mode as the intra prediction mode of the current is higher than those of the other directional modes, a small mode number (for example, mode number 0) is assigned to the planar mode and the above-mentioned method can be applied. In this case, the mode numbers of the other lower-ranked modes increase by 1.

Alternatively, the lowest indices may be assigned to the non-directional modes. For example, when the intra prediction mode of the current block is the planar mode and the residual intra prediction modes include the planar mode, the intra prediction mode index may include 0. For example, when the residual intra prediction modes include the planar mode and the DC mode, the intra prediction mode corresponding to the prediction mode index in a state where the planar mode, the DC mode, and the directional modes are arranged in this order may be set as the intra prediction mode of the current block. For example, mode number 0 and mode number 1 may be assigned to the planar mode the DC mode, respectively, or mode number 0 and mode number 1 may be assigned to the DC mode and the planar mode, respectively. In this case, the intra prediction mode index of the current block may be compared with the intra prediction mode numbers belonging to the MPM group to determine the intra prediction mode of the current block.

The prediction block size determining module 330 determines the size of the prediction block of the current block using the block transform size. The size of the prediction block may have the size of the current block or the size of sub blocks of the current block.

When the size of the prediction block is equal to the size of the current block, the prediction block is created using the intra prediction mode of the current block and the reference pixels of the current block. The reference pixels are pixels reconstructed or created previously to the current block.

When the size of the prediction block is smaller than the size of the current block, that is, when the current block can be divided into plural sub blocks and the intra prediction is performed thereon, the same intra prediction mode (that is, the intra prediction mode of the current block) is used to create the prediction block of each sub block. The prediction blocks of the second sub block or sub blocks subsequent thereto in the decoding order are created using the reconstructed pixels of the preceding sub blocks. Therefore, after the prediction block, the residual block, and the reconstructed block are created in the units of sub blocks, the prediction block of the next sub block is created.

The specific steps of the above-mentioned operation will be described later.

Then, the reference pixel validity determining module 340 determines whether the reference pixels of the block corresponding to the size of the prediction block are all valid. The reference pixels are pixels which are previously decoded and reconstructed.

When it is determined that at least one of the reference pixels is not valid, the reference pixel validity determining module 340 creates the reference pixels.

Specifically, when it is determined that the reference pixels are not valid at all, the reference pixel values are replaced with values of 2L-1. Here, L represents the number of bits representing the gray scale of luma components.

When valid reference pixels are present in only one direction with respect to the position of the invalid reference pixel, the closest reference pixel out of the valid reference pixels is copied to create the reference pixels.

When valid reference pixels are present in both directions with respect to the position of the invalid reference pixel, the reference pixel located at the closest position in a predetermined direction can be copied or two closest reference pixels in both directions can be averaged to create the reference pixels.

The reference pixel filtering module 360 determines whether the reference pixels should be filtered. The reference pixels are adaptively filtered depending on the reconstructed intra prediction mode and the size of the prediction block.

The reference pixels are not filtered when the intra prediction mode is the DC mode. When the intra prediction modes are the vertical mode and the horizontal mode, the intra prediction module 240 does not also filter the reference pixels. However, when the intra prediction modes are directional modes other than the vertical mode and the horizontal mode, the reference pixels are adaptively filtered depending on the intra prediction mode and the size of the prediction block. When the size of the prediction block is 4×4, the reference pixels are not filtered for the purpose of a decrease in complexity regardless of the intra prediction mode. The filtering serves to smooth the variation in pixel value between reference pixels and uses a low-pass filter. The low-pass filter may be [1, 2, 1] which is a 3-tap filter or [1, 2, 4, 2, 1] which is a 5-tap filter. When the size of the prediction block ranges from 8×8 to 32×32, the reference pixels are filtered in more intra prediction modes with an increase in the size of the prediction block.

The prediction block creating module 370 creates the prediction block depending on the intra prediction mode. The reference pixels used for the prediction block may be pixels which are adaptively filtered depending on the size of the prediction block and the intra prediction mode.

In the DC mode, the average values of N top reference pixels located at positions of (x=0, . . . , N−1, y=−1), M left reference pixels located at positions of (x=1−, y=0, . . . , M−1), and the corner pixel located at a position of (x=−1, y=−1) can be determined as the prediction pixels of the prediction block. However, the prediction pixels neighboring the reference pixels can be created using weighted average of the average value and the reference pixel neighboring the prediction pixel. In the planar mode, the prediction pixels can be created in the same was as in the DC mode.

In the vertical mode, the reference pixels located in the vertical direction are set to the prediction pixels. However, each prediction pixel neighboring the left reference pixel can be created using the reference pixel located in the vertical direction and the variation between the left reference pixels. The variation represents the variation between the corner reference pixel and the left reference pixel neighboring the prediction pixel. In the horizontal mode, the prediction pixels can be created in the same way as in the vertical mode, except for the direction.

Figure 6:
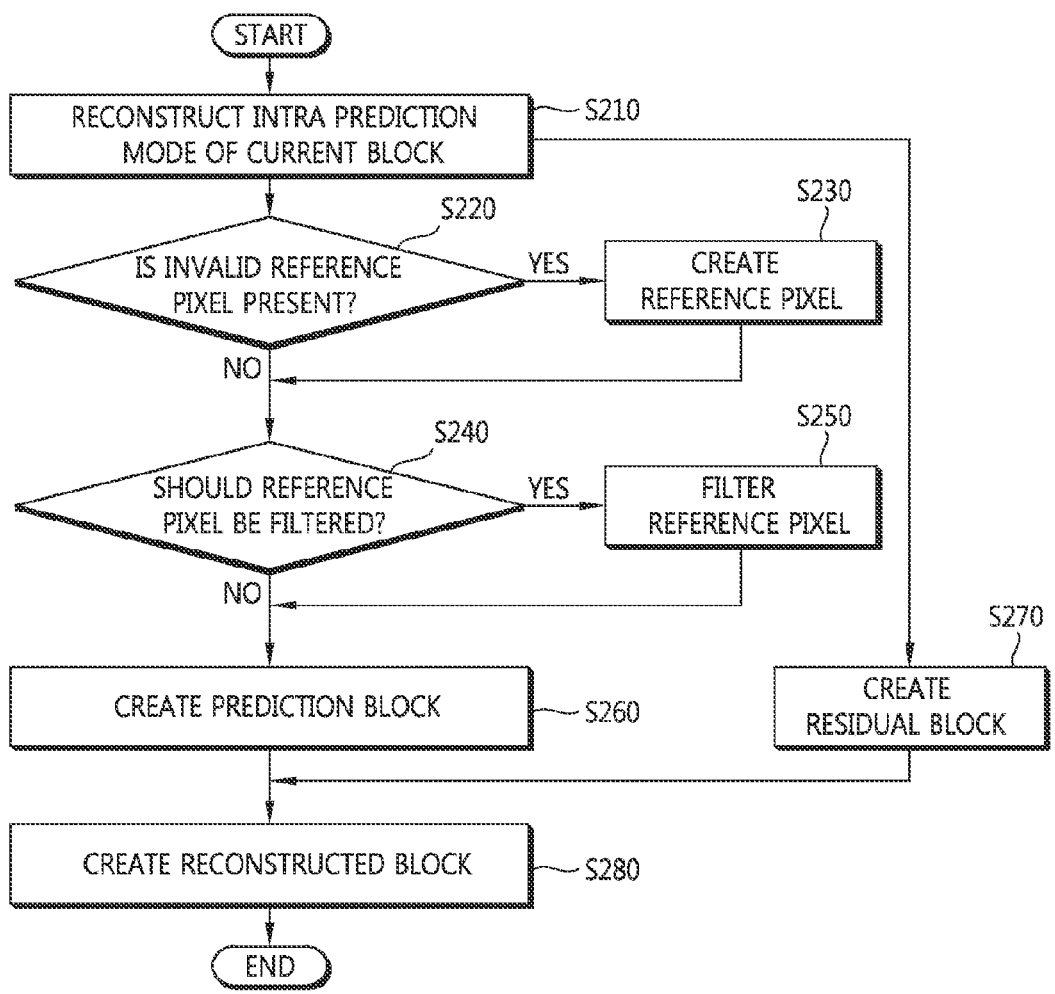
FIG. 6 is a diagram illustrating a reconstructed block creating sequence according to the embodiment of the invention.

FIG. 6 is a diagram illustrating a reconstructed block creating sequence according to the embodiment of the invention. FIG. 6 shows the reconstructed block creating sequence when the size of the prediction block is equal to the size of the current block.

First, the intra prediction mode of the current block is reconstructed (S210). The intra prediction mode is reconstructed using the same method described in step S120 of FIG. 3.

Then, it is determined whether all the reference pixels at predetermined positions of the current block are valid (S220). When at least one of the reference pixels at the predetermined positions is not valid, the invalid reference pixel at the corresponding position is created (S230). The method of creating the reference pixel is the same as in step S150 of FIG. 3. Here, the size of the prediction block is equal to the size of the current block.

Subsequently, it is determined whether the reference pixels of the current block should be filtered (S240). Depending on the reconstructed intra prediction mode and the size of the current block, it is determined whether the reference pixels should be filtered. The method described in step S170 of FIG. 3 is used to determine whether the reference pixels should be filtered. When it is determined that the reference pixels of the current block should be filtered, the reference pixels of the current block are filtered (S250).

Then, the prediction block of the current block is created using the reconstructed intra prediction mode (S260). The residual block is created using the reconstructed intra prediction mode (S270). The size of the residual block is equal to the size of the current block.

Finally, the prediction block of the current block and the residual block of the current block are added to create a reconstructed block (S280).

Figure 7:
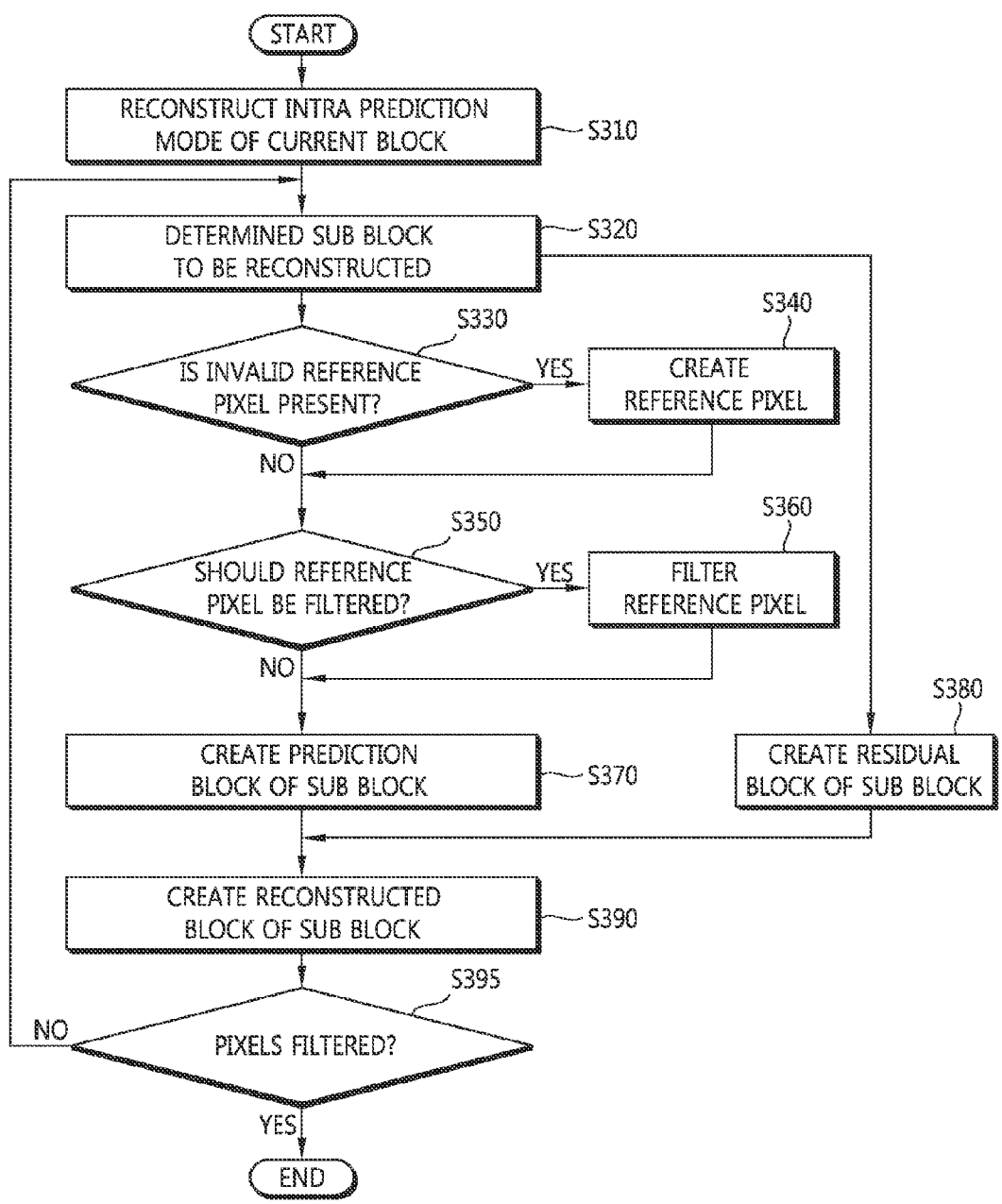
FIG. 7 is a diagram illustrating a reconstructed block creating sequence according to another embodiment of the invention.

FIG. 7 is a diagram illustrating a reconstructed block creating sequence according to another embodiment of the invention. FIG. 7 shows the reconstructed block creating sequence of the current block when the size of the prediction block is smaller than the size of the current block.

First, the intra prediction mode of the current block is reconstructed (S310). The intra prediction mode is reconstructed using the same method as in step S120 of FIG. 3.

A sub block of the current block to be decoded is determined (S320).

Then, it is determined whether all the reference pixels at predetermined positions of the sub block are valid (S330). When at least one of the reference pixels at the predetermined positions is not valid, the invalid reference pixel at the corresponding position is created (S340). The method of creating the reference pixel is the same as in step S150 of FIG. 3. Here, the size of the prediction block is equal to the size of the current block.

Subsequently, it is determined whether the reference pixels of the sub block should be filtered (S350). Depending on the reconstructed intra prediction mode and the size of the current block, it is determined whether the reference pixels should be filtered. The method described in step S170 of FIG. 3 is used to determine whether the reference pixels should be filtered. When it is determined that the reference pixels of the sub block should be filtered, the reference pixels of the sub block are filtered (S360).

Then, the prediction block of the sub block is created using the reconstructed intra prediction mode (S370). The residual block of the sub block is created using the reconstructed intra prediction mode (S380).

Subsequently, the prediction block of the current block and the residual block of the current block are added to create a reconstructed block (S390).

Then, it is determined whether the sub block is the final sub block of the current block (S395). When the sub block is not the final sub block of the current block, the sequence from the process (S320) of determining a next sub block in the encoding order to the process (S390) of creating the prediction block of the sub block is repeatedly performed. In this case, the sub blocks subsequent to the fist sub block in the decoding order use some pixels of the reconstructed previous sub block as the reference pixels of the sub blocks. Since invalid reference pixels are always present in the sub blocks subsequent to the first sub block, the process of step S340 may be performed without performing the process of step S330. When the sizes of the sub blocks are the same, the reference pixel filtering process may be performed on the first sub block but may not be performed on the subsequent sub blocks.

While the invention has been described with reference to the embodiments, it will be able to be understood by those skilled in the art that the invention can be modified and changed in various forms without departing from the spirit and scope of the invention described in the appended claims.

The invention claimed is:

1. An image decoding method comprising: reconstructing an intra prediction mode group indicator and a prediction mode index of a current block:
constructing a Most Probable Mode (MPM) group including three intra prediction modes using valid intra prediction modes of left and top blocks of the current block;
determining the intra prediction mode corresponding to the prediction mode index in the MPM group as the intra prediction mode of the current block when the intra prediction mode group indicator indicates the MPM group and determining the intra prediction mode of the current block using the three intra prediction modes of the MPM group and the prediction mode index when the intra prediction mode group indicator does not indicate the MPM group; and
creating a prediction block on the basis of the determined intra prediction mode when a size of the current block is equal to a size of the prediction block, and creating a plurality of prediction blocks on the basis of the determined intra prediction mode when the size of the current block is larger than the size of the prediction block,
wherein the size of the prediction block is determined depending on transform size information, and
wherein when only one of the intra prediction modes of the left and top blocks of the current block is valid, two intra prediction modes are added to the MPM group.

2. The image decoding method according to claim 1, wherein the added two intra prediction modes are determined depending on the valid intra prediction mode.

3. The image decoding method according to claim 1, wherein the second block in the decoding order of the plurality of prediction blocks is created using a part of pixels of a first prediction block as reference pixels.

4. The image decoding method according to claim 1, wherein when the intra prediction modes of the left and top blocks are not equal to each other and directional intra prediction modes, the MPM group includes the intra prediction modes of the left and top blocks and a planar mode.

5. The image decoding method according to claim 1, wherein when the intra prediction modes of the left and top blocks are not equal to each other and non-directional intra prediction modes, the MPM group includes the intra prediction modes of the left and top blocks and a vertical mode.

6. The image decoding method according to claim 5, wherein the non-directional intra prediction modes are a planar mode and a DC mode, and the mode number 0 is assigned to the planar mode and the mode number 1 is assigned to the DC mode.

* * * * *